United States Patent
Miyazaki (10) Patent No.: US 9,724,777 B2
(45) Date of Patent: Aug. 8, 2017

(54) SYSTEM AND METHOD FOR INDUCTION HEATING OF A SOLDERING IRON

(75) Inventor: Mitsuhiko Miyazaki, Osaka (JP)

(73) Assignee: Hakko Corporation, Osaka-shi Osaka (JP)

( * ) Notice: Subject to any disclaimer, the term of this patent is extended or adjusted under 35 U.S.C. 154(b) by 1692 days.

(21) Appl. No.: 12/420,362

(22) Filed: Apr. 8, 2009

(65) Prior Publication Data
US 2010/0258554 A1    Oct. 14, 2010

(51) Int. Cl.
*B23K 3/03*    (2006.01)

(52) U.S. Cl.
CPC .............. *B23K 3/03* (2013.01); *B23K 3/033* (2013.01)

(58) Field of Classification Search
None
See application file for complete search history.

(56) References Cited

U.S. PATENT DOCUMENTS

| | | | |
|---|---|---|---|
| 3,953,700 A | 4/1976 | Sindt | |
| 4,789,767 A | 12/1988 | Doljack | |
| 4,795,886 A * | 1/1989 | Carter, Jr. ..................... | 219/505 |
| 4,877,944 A * | 10/1989 | Cowell et al. ................ | 219/548 |
| 4,935,600 A * | 6/1990 | Pachschwoll ................. | 219/241 |
| RE33,644 E | 7/1991 | Hall | |
| 5,126,521 A | 6/1992 | McGaffigan | |
| 5,128,504 A | 7/1992 | McGaffigan | |
| 5,189,271 A | 2/1993 | Derbyshire | |
| 5,319,173 A | 6/1994 | McGaffigan | |
| 5,352,868 A | 10/1994 | Denen et al. | |
| 5,369,247 A | 11/1994 | Doljack | |
| 5,408,072 A | 4/1995 | Nagase | |
| 5,427,846 A | 6/1995 | McGaffigan | |
| 5,445,635 A * | 8/1995 | Denen .................... | A61B 18/08 219/240 |
| 6,046,442 A | 4/2000 | Kawamura et al. | |
| 6,111,222 A * | 8/2000 | Hattori ................... | B23K 3/033 219/240 |
| 6,153,863 A * | 11/2000 | Snowball ....................... | 219/626 |
| 6,713,732 B2 | 3/2004 | Mathews, Jr. et al. | |
| 6,946,623 B2 * | 9/2005 | Evanyk ......................... | 219/240 |
| 7,259,356 B2 * | 8/2007 | Cowell et al. ................. | 219/238 |
| 8,165,725 B2 * | 4/2012 | Liu ............................... | 700/299 |

(Continued)

FOREIGN PATENT DOCUMENTS

| | | | |
|---|---|---|---|
| CA | 1311808 | 12/1992 | |
| DE | 10220297 A1 * | 11/2003 | ............. B23K 3/033 |
| EP | 294966 | 12/1988 | |

(Continued)

OTHER PUBLICATIONS

Burnett, Richie, "High Frequency Induction Heating", Internet Archive Dated at least Mar. 21, 2008, <http://www.richieburnett.co.uk/indheat.html>.*

*Primary Examiner* — Keith Walker
*Assistant Examiner* — Jacky Yuen
(74) *Attorney, Agent, or Firm* — Squire Patton Boggs (US) LLP (57) ABSTRACT

A soldering iron system includes a power assembly that provides power to an induction heater at a variable voltage and a variable frequency. A control assembly adjusts the temperature of the heater in accordance with signals from a current detector coupled to the induction heater and a selection made by the user on an operating level selector.

18 Claims, 6 Drawing Sheets

(56) References Cited

U.S. PATENT DOCUMENTS

2006/0086718 A1    4/2006   Fukamachi et al.

FOREIGN PATENT DOCUMENTS

| | | |
|---|---|---|
| JP | 64-007488 | 1/1989 |
| JP | A 64-007488 | 1/1989 |
| JP | 08-293668 | 11/1996 |
| JP | A 08-293668 | 11/1996 |
| JP | 11010325 A * | 1/1999 |
| JP | 2005-205425 | 8/2005 |
| JP | A 2005-205425 | 8/2005 |
| WO | WO 2006099801 A1 * | 9/2006 |
| WO | WO 2008038253 A2 * | 4/2008 |

* cited by examiner

FIG. 6

SYSTEM AND METHOD FOR INDUCTION HEATING OF A SOLDERING IRON

FIELD OF THE INVENTION

This invention relates generally to soldering irons and, more particularly, to induction heating of soldering irons.

BACKGROUND OF THE INVENTION

Electromagnetic induction has been used to heat soldering irons. An advantage of using induction heating is the reduced heat loss of the working tip as compared to indirect methods of heating in which heat from a separate resistance coil heater must be transferred to the working tip. Electrical eddy currents are induced in the working tip of the soldering iron. The eddy currents are generally concentrated at or near the surface of the working tip. Due to electrical resistance, eddy currents lead to Joule heating of the working tip. In cases where the working tip is made of a ferrous material, additional heating occurs through magnetic loss or hysteresis heating, which arises from the rapid flipping of magnetic domains inside the material.

As the temperature of the working tip increases, the eddy currents are induced not only at the surface, but also at regions deeper inside the working tip. Above a certain temperature, the eddy currents on either side of the working tip begin to cancel each other resulting in the loss of induced current in the working tip, which leads to a decrease or cessation of Joule heating. Also, resistance to current flows and Joule heating decreases as temperature increases. In addition, ferrous materials loose their magnetic properties at the Curie point or temperature (Tc), which means they do not exhibit hysteresis heating above Tc. The Curie point is a property of the material of the working tip. For example, iron has a Tc of about 1043 K or 770 degrees C. As the working tip drops below Tc, Joule heating increases and hysteresis heating resumes. In this way, the temperature of the working tip may be autoregulated at Tc without the use of a temperature sensor.

One disadvantage of relying solely on Curie point autoregulation is that the working tip is maintained only at a single temperature. It is often desirable to keep the working tip of a soldering iron below a particular temperature to avoid overheating delicate electronic components, such as integrated circuits. However, the ideal soldering temperature may vary from component to component. Also, it may be desirable at times to have a higher working tip temperature to solder larger or less sensitive components more efficiently. Since Tc is a function of the working tip material, different working tips would have to be used for different soldering tasks, which can be inconvenient and costly. Another disadvantage of relying solely on Curie point autoregulation is that inherent manufacturing variances in the working tip material and variances during assembly would cause one working tip to have a slightly different temperature than another working tip, which may lead to inconsistent quality in the work product.

Accordingly, there is a need for a system and method for induction heating of a soldering iron that can be precisely adapted for various soldering tasks in a convenient and cost-effective manner.

SUMMARY OF THE INVENTION

Briefly and in general terms, the present invention is directed to a soldering iron system and a method for operating a soldering iron. In aspects of the present invention, the system includes a power assembly adapted to deliver power at an output voltage and an output frequency. The system also includes a magnetic induction heater adapted to receive the power from the power assembly, the heater having an actual temperature (Ta) dependant upon the output voltage and the output frequency of the power assembly. The system further includes a current detector adapted to detect a current flow in the heater, and a temperature selector indicating a desired temperature of the heater. The system also includes a control assembly in communication with the current detector and the temperature selector, the control assembly adapted to change at least one of the output voltage and the output frequency in accordance with the desired temperature and the current flow in the heater.

In other aspects of the invention, the method includes selecting an operation level from among a plurality of operation levels, and supplying power to a coil at a voltage and a frequency, at least one of the voltage and the frequency being dependant upon the selected operation level, the voltage and the frequency sufficient to induce magnetic induction heating of a soldering iron tip. The method also includes determining a change in current flow in the coil, and adjusting at least one of the voltage and the frequency in accordance with the determined change in the current flow.

The features and advantages of the invention will be more readily understood from the following detailed description which should be read in conjunction with the accompanying drawings.

DETAILED DESCRIPTION OF THE PREFERRED EMBODIMENTS

Figure 1:
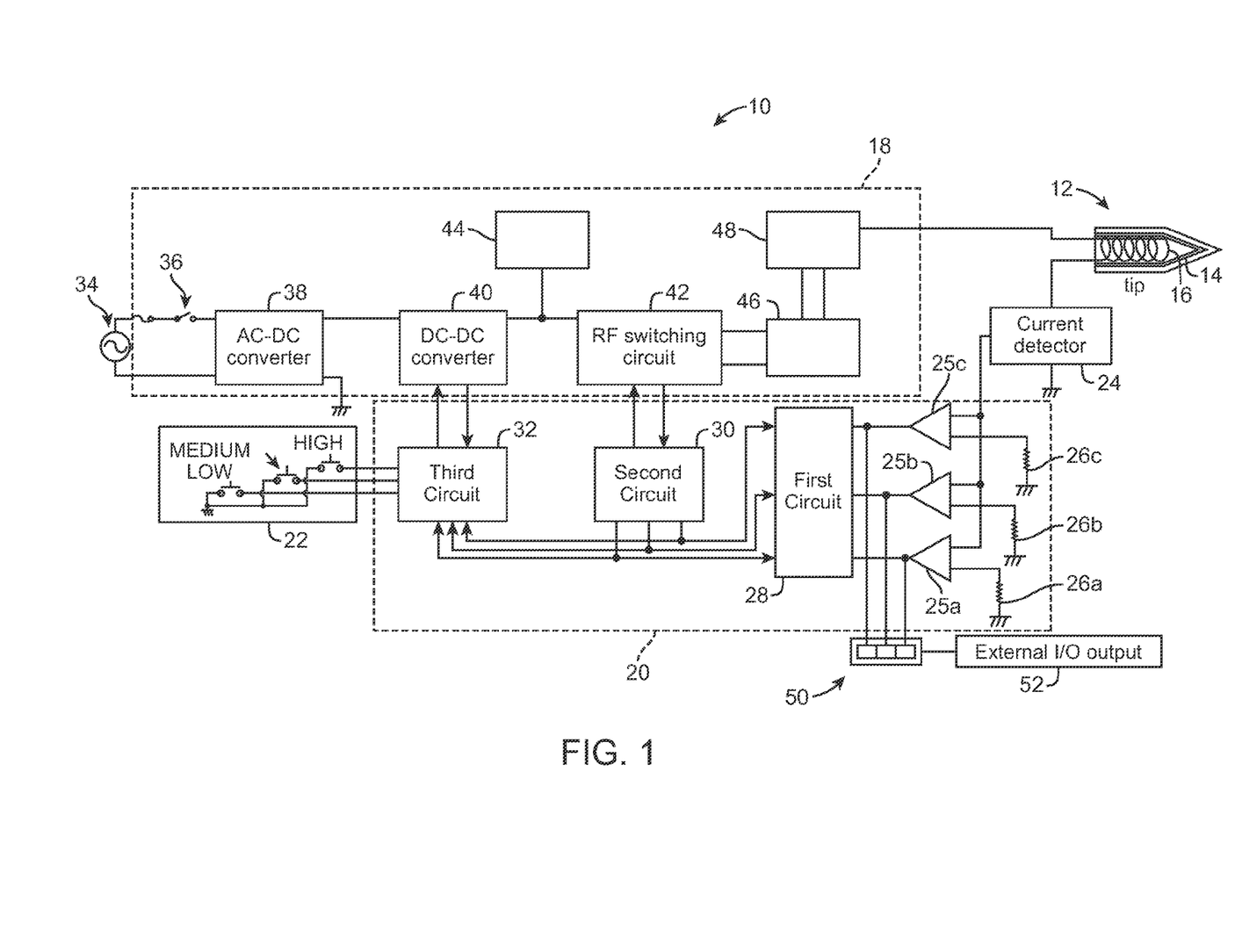
FIG. 1 is a block diagram of a soldering iron system in accordance with aspects of the present invention, showing a soldering iron tip coupled to a power assembly and a control assembly.

Referring now in more detail to the exemplary drawings for purposes of illustrating embodiments of the invention, wherein like reference numerals designate corresponding or like elements among the several views, there is shown in FIG. 1 a soldering iron system 10 that utilizes induction heating of a soldering iron tip 12. As will be apparent from the description below, the temperature of the tip can be precisely adapted for various soldering tasks in a convenient and cost-effective manner.

The tip includes an induction heating portion 14, which may be made of a magnetic alloy, and a coil 16 that produces magnetic flux that induces current in the heating portion 14 when electrical power is delivered to the coil 16. The heating portion 14 may be in the form of a thin layer of ferromagnetic material surrounding the coil 16. It will be appreciated that any tip configuration suitable for induction heating may be used with the present invention. For example, the tip configurations described in U.S. Pat. No. 5,408,072, which is incorporated herein by reference, may be implemented in other embodiments of the present invention.

A power assembly 18 provides electrical power to the coil 16 at a particular output voltage and output frequency. The power assembly is capable of providing power at different voltages and frequencies in order to maintain the tip 12 at a desired operating temperature.

A control assembly 20 is adapted to maintain the temperature of the tip 12 at or around the desired operating temperature. The control assembly 20 receives control inputs from a temperature selector 22 and a current detector 24. The temperature selector 22 is connected to the control assembly 20 and is configured to be manually manipulated by the user of the soldering iron system 10 in order to select the desired operating level, which may correspond to the power level provided by the power assembly 18 to the heater and may correspond to a desired operating temperature. In the illustrated embodiment of FIG. 1, the temperature selector 22 allows the user to select from among low, medium, or high operation levels.

In some embodiments, operation level settings may allow for a step-wise adjustment relative to a nominal temperature. The nominal temperature may be predetermined at a fixed value. For example, the nominal temperature may be the Curie temperature (Tc) of the heating portion 14 of the tip 12. As a further example, the low, medium, and high settings may correspond to desired operating temperatures of Tc minus 50 degrees C., Tc, and Tc plus 50 degrees C., respectively. It will be appreciated that other nominal temperatures and other operation levels may be implemented.

In other embodiments, the operation level settings may allow for a step-wise adjustment in terms of a percent change in the output voltage of the power assembly 18. For example, the low, medium, and high settings may correspond to a 5% decrease, 0% increase, and 5% increase in the output voltage, respectively. It will be appreciated that other percentages and other operation levels may be implemented.

In other embodiments, a greater number of discrete settings may be implemented to allow for finer control through a greater number of choices. In other embodiments, the selector 22 may include a numeric keypad that allows for direct input by the user of the desired operating temperature in a predetermined range. In yet other embodiments, the temperature selector 22 may include a variable resistor or other device that allows for continuous adjustment of the desired operating temperature in a predetermined range as compared to step-wise adjustment.

Referring again to FIG. 1, the current detector 24 is adapted to measure the level of electrical current in the coil 16 in the tip 12. The current detector 24 may include a series resistor and a device for measuring the voltage across the resistor. The desired operating temperature and the amount of temperature change determined from the measured current are used by the control assembly 20 to selectively provide more or less power from the power assembly 18 to the coil 16 in order to maintain the tip 12 at or around the desired operating temperature. The desired operating temperature is obtained by the control assembly 20 from the temperature selector 22. The selection made by the user at the temperature selector 22 determines the desired temperature.

The current measured by the detector 24 will vary depending upon the impedance of the coil 16, which depends upon the magnetic property of the heating portion 14 of the tip 12. The heating portion 14 is ferromagnetic below the Curie temperature and is paramagnetic at the Curie temperature. Thus, the magnetic property varies with the temperature of the heating portion 14. Stated another way, the temperature of the heating portion 14 affects the magnetic property of the heating portion 14, which affects the impedance of the coil 16, which in turn affects the measured current in the coil 16.

Still referring to FIG. 1, the control assembly 20 includes a plurality of comparators 25a, 25b, 25c for comparing the measured current with a plurality of reference levels that define ranges or bins.

In some embodiments, the reference levels and ranges may be predetermined at fixed values in accordance with the resistance values of resistors 26a, 26b, 26c coupled to the comparators. The comparators provide output signals to a first circuit 28, which uses the signals it receives from the comparators to determine the range that corresponds with the measured current. The first circuit 28 provides a particular pulse output depending upon the range that corresponds with measured current. That is, the first circuit 28 adjusts its pulse outputs depending upon the level of the measured current. The first circuit 28 can be an integrated circuit or a combination of discrete electronic components.

Adjustment of the pulse output can be accomplished in many ways. For example, when the measured current indicates that the amount of change in temperature is relatively small, the pulse output can include a series of pulses having a relatively short pulse width. That is, for a relatively small temperature change, the pulse output has a relatively low duty cycle, i.e., a relatively low fraction of time in an active state. When the amount of change in temperature is relatively large, the pulse output can include a series pulses having a relatively long pulse width. That is, for a relatively large temperature change, the pulse output has a relatively high duty cycle.

The control assembly 20 includes a second circuit 30 adapted to change the output frequency delivered by the power assembly 18 to the tip 12. The pulse outputs from the first circuit 28 are used by the second circuit 30 to provide control signals for changing the output frequency delivered by the power assembly 18. The second circuit 30 can be an integrated circuit or a combination of discrete electronic components.

The control assembly 20 further includes a third circuit 32 adapted to change the output voltage delivered by the power assembly 18 to the tip 12. The pulse outputs from the first circuit 28 are used by the third circuit 32 to provide control signals for changing the output voltage delivered of the power assembly 18. The third circuit 32 can be an integrated circuit or a combination of discrete electronic components.

In some embodiments, the first circuit 28 provides a first type of pulse output when the measured current is within a first range defined by the first comparator 25a. When the measured current is within a second range defined by the second comparator 25b, the first circuit 28 provides a second type of pulse output. Also, the first circuit 28 provides a third type of pulse output when the measured current is within a third range defined by the third comparator 25c.

In some embodiments, the first range does not overlap the second and third ranges, the second range overlaps only the first range, and the third range overlaps the first and second ranges. In this way, when the measured current is within the first range, only the first type of pulse output is provided by the first circuit 28 to the second and third circuits 30, 32. When the measured current is within the second range, both the first and second types of pulse outputs are provided by the first circuit 28 to the second and third circuits 30, 32. Also, when the measured current is within the third range, the first, second, and third types of pulse outputs are provided by the first circuit 28 to the second and third circuits 30, 32. The combination of pulse outputs provided by the first circuit 28 are used by the second and third circuits 30, 32 to adjust one or both of the output voltage and the output frequency.

In other embodiments, the first, second, and third ranges do not overlap each other. In this way, only one type of pulse output is provided by the first circuit 28 at any one time. For example, the ranges may correspond to the amount of temperature change in the heating portion 14 relative to the temperature selected at the temperature selector 22. For example, the first range may correspond to the temperature change amount from 25 degrees C. to 50 degrees C. below the desired temperature (Td) selected by the user at temperature selector 22, the second range may correspond to temperatures (T) from about 25 degrees below Td to about 25 degrees above Td, and the third range may correspond to temperatures (T) from 25 degrees above Td to 50 degrees above Td. It will be appreciated that other temperature ranges may be implemented.

In the illustrated embodiment of FIG. 1, the temperature selector 22 is operatively coupled only to the third circuit 32 such that the desired operating temperature that was selected via the selector 22 is achieved by adjusting only the output voltage level. In other embodiments, the temperature selector 22 may be operatively coupled to both the second and third circuits 30, 32 such that the desired operating temperature may be achieved by adjusting both of the output voltage and the output frequency.

Figure 2A:
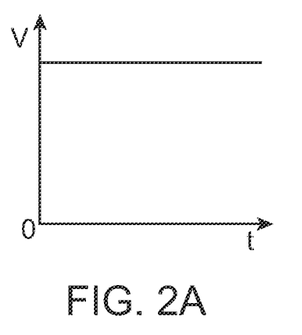
FIG. 2A-2C are graphs showing exemplary voltage waveforms at different points within the power assembly of FIG. 1.

With continued reference to FIG. 1, the power assembly 18 is connected to an AC power supply 34. A fuse and main power switch 36 connect the power supply 34 to a rectifier or an AC-DC converter 38 in the power assembly 18. The main power switch may be manipulated by the user to turn the entire system 10 on and off. DC power from the AC-DC converter 38 is fed to a DC-DC converter 40, which is adapted to provide a constant DC output voltage. The level of the constant DC output voltage is determined by the control signals from the third circuit 32 of the control assembly 20. An exemplary constant DC output voltage provided by the DC-DC converter 40 is shown in FIG. 2A. In FIG. 2A, the DC output voltage is shown at a 100% duty cycle. As will be explained below, the duty cycle may in some embodiments be reduced when implementing time-based proportional control.

Figure 2B:
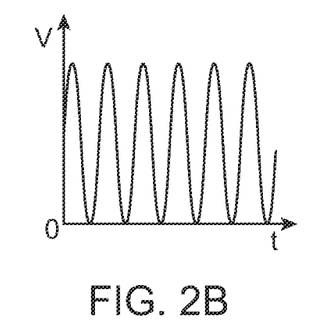

Next, the constant DC output voltage is fed to an RF switching circuit 42, which is adapted to provide the DC voltage at an output frequency determined by the control signals from the second circuit 30 of the control assembly 20. An exemplary output waveform provided by the RF switching circuit 42 is shown in FIG. 2B. In some embodiments, the RF switching circuit 42 is adapted to provide an output frequency from about 100 kHz to 200 kHz. With an output frequency in the 100-200 kHz range, the resistance and power loss in the coil 16 is relatively small, which improves efficiency by minimizing or preventing resistance heating in the coil 16 itself.

Preferably, the RF switching circuit 42 is adapted to provide an output frequency from about 200 kHz to 600 kHz. More preferably, the RF switching circuit 42 is adapted to provide an output frequency from about 350 kHz to 550 kHz.

In some embodiments, it is desirable to have a relatively high impedance in the coil 16. This is because a higher impedance in the coil 16 will allow detection of smaller temperature-induced changes in the magnetic property of the heating portion 14. One way to increase impedance in the coil 16 is to have a greater number of coil loops or windings, which would increase the physical size of the coil 16. However, size constraints for hand-held soldering irons place limits on the number of windings in the coil 16. Increasing impedance solely by increasing the number of windings is also undesirable because doing so would increase the electrical resistance of the coil, which would increase power loss in the form of heat.

Another method of increasing impedance in the coil 16 is to power the coil at a greater output frequency, which avoids problems associated with increasing the number of coil windings. Increasing the output frequency above 550 kHz, however, results in greater power loss, which could make it more difficult and more expensive to provide sufficient power to maintain the desired operating temperature of the tip 12. Applicant has found that an output frequency from about 350 kHz to about 550 kHz is optimal for soldering irons in that it appropriately balances the need to have a relatively high impedance in the coil 16 with physical size constraints and manageable power loss.

Still referring to FIG. 1, the power assembly 18 may also include a power supply circuit 44. The power supply circuit 44 is configured to provide power to any integrated circuits (ICs) within the power assembly 18 and the control assembly 20. Integrated circuits typically require voltages at constant levels lower than that provided by the DC-DC converter 40 for heating the tip 12.

Figure 2C:
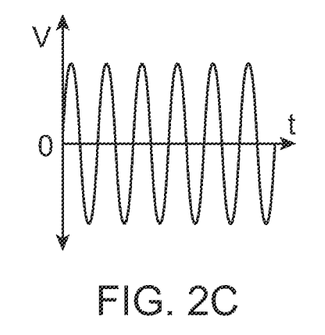

The power assembly 18 may further include a voltage level converter 46. The voltage level converter changes the voltage waveform in FIG. 2B to an AC voltage waveform shown in FIG. 2C. In FIG. 2B, the voltage levels are centered above zero volts with peak voltages at or about the same as the DC voltage level provided by the DC-DC converter 40 shown in FIG. 2A. In FIG. 2C, the voltage levels are centered at or about the zero volt level. That is, the voltage levels in FIG. 2C alternate above and below the zero volt level which induces rapid flipping of magnetic domains inside the heating portion 14 of the tip 12, which in turn results in magnetic loss or hysteresis heating.

The power assembly 18 may also include an impedance matching circuit 48 between the coil 16 and the voltage level converter 46. The impedance matching circuit 48 can include a parallel capacitor or a series of resistors and inductors, which provide an impedance match to that of the coil 16. In this way, power is efficiently transferred to the coil 16.

In some embodiments, the soldering iron system 10 includes a booster function to compensate for large or rapid changes in temperature of the soldering iron tip 12 during soldering operations, such as when the tip is positioned in contact with a relatively large workpiece having a low temperature. The booster function may be hardwired or programmed into the first circuit, or may reside in one or more separate modules or circuits within the control assembly 20.

In an embodiment according to FIG. 1, a booster function incorporates three operating control modes as shown in TABLE I. Each operating control mode corresponds to a range in temperature drop detected in the soldering iron tip 12. Each range is defined by a predetermined upper value and lower value. A temperature drop sensed by the current detector 24 is categorized as being within one of the three operating control modes, which determines the pulse width or output level provided by the first circuit 28 to the second and third circuits 30, 32. Depending on the pulse width or output level, the second and third circuits 30, 32 cause a change in DC output voltage from the DC-DC converter (FIG. 2A) and a change in frequency (FIG. 2B) in order to bring the soldering iron tip 12 back to the desired temperature as quick as possible.

TABLE I

| (a) Operating Control Mode As Determined from Current Measurement | (b) Duration of Signal Change from Comparator (seconds) | Effect on Power Assembly | |
|---|---|---|---|
| | | Voltage Level | Frequency Change |
| 3 (large temperature drop) | 1 sec or greater | Increase | Increase |
| | Less than 1 sec | No change | No change |
| 2 (intermediate temperature drop) | 2 sec or greater | Increase | No change |
| | Less than 2 sec | No change | No change |
| 1 (small temperature drop) | 2 sec or greater | Increase | No change |
| | Less than 2 sec | No change | No change |

TABLE I provides an example of a booster function when the temperature selector 22 is set by a user to a medium or middle setting, which may be labeled as "MID" on the temperature selector. The output from the first circuit 28 depends upon (a) the operating control mode as determined from the current measurement and (b) the duration of the change in measured current and the corresponding drop in temperature. The first factor, (a) in TABLE I, is determined from the magnitude of a change in signal from the comparator 25 to the first circuit 28. The second factor, (b) in TABLE I, corresponds to the time duration of the change in signal from the comparator 25 to the first circuit 28. The first circuit 28 is adapted to determine the magnitude of the change in signal and the time duration of the change.

Still referring to TABLE 1, a relatively small change in measured current corresponds to "Operating Control Mode 1." That is, the power and control assemblies 18, function under "Operating Control Mode 1" whenever a relatively small change is detected by the first circuit 28. When this relatively small change in current lasts less than three seconds, the control circuit 20 causes no change in output voltage level and frequency from the power assembly 18. When the relatively small change in current continues for three seconds or more, the control circuit 20 causes the power assembly 18 to increase the output voltage to the soldering iron tip 12, which boosts power to the coil 16 to allow the coil to more rapidly return to the desired temperature.

An intermediate change in current measured by the current detector 24 corresponds to "Operating Control Mode 2" in TABLE I. That is, the power and control assemblies 18, function under "Operating Control Mode 2" whenever an intermediate change is detected by the first circuit 28. When the intermediate change in current lasts less than two seconds, the control circuit 20 causes no change in output voltage level and frequency from the power assembly 18 to the coil 16. When the intermediate change in current continues for three two or more, the control circuit 20 causes the power assembly 18 to increase the output voltage to the soldering iron tip 12, thereby boosting power to the coil 16.

A relatively high change in current measured by the current detector 24 corresponds to "Operating Control Mode 3" in TABLE I. That is, the power and control assemblies 18, function under "Operating Control Mode 3" whenever a relatively high change is detected by the first circuit 28. When the relatively high change in current lasts less than one second, the control circuit 20 causes no change in output voltage level and frequency from the power assembly 18 to the coil 16. When the relatively high current change continues for one second or more, the control circuit 20 causes the power assembly 18 to increase both the output voltage and frequency to the soldering iron tip 12, thereby boosting power to the coil 16.

In the example shown in TABLE I, the time duration required to trigger a boost in power level to the coil 16 varies inversely with the level of current change measured by the current detector 24. That is, the required time duration decreases as the measured change in current increases.

It will be appreciated that the actual threshold levels for determining whether a measured change in current is relatively small, intermediate, and relatively high may depend upon the type of soldering iron tip 12 and the type of soldering operation being performed using the soldering iron tip. In some embodiments, the threshold levels for measured current that define small, intermediate, and high temperature drops may be adjusted using temperature selector 22.

It is to be understood that time durations required to trigger a boost may differ from what is shown in TABLE I depending on the type of soldering iron tip 12 and the type of soldering operation being performed using the soldering iron tip. For example, a power boost may be triggered when a large temperature drop lasts for a half second or more, when an intermediate temperature drop lasts for 1 second or more, and when a small temperature drop lasts for 1.5 seconds or more. In some embodiments, the time durations required to trigger a boost may be adjusted using the temperature selector 22. For example, moving the temperature selector 22 higher (e.g., from "low" to "medium" or from "medium" to "high"), may in some embodiments, decrease the time durations required to trigger a boost, thereby allowing for a more rapid response to temperature drops.

Also, the effect on power assembly may differ from what is shown in TABLE I depending on the type of soldering iron tip 12 and the type of soldering operation being performed using the soldering iron tip. For example, a power boost for an intermediate temperature drop may, in some embodiments, cause the power assembly 18 to increase both the output voltage and frequency. In some embodiments, the effect on power assembly when a power boost is triggered may be adjusted using the temperature selector 22. For example, moving the temperature selector 22 from "medium" to "high", may in some embodiments, cause the power assembly 18 to increase both output voltage and frequency when a power boost is triggered during an intermediate drop in temperature. Thus it will be appreciated that the temperature selector 22 provides a way to adjust how performance of the soldering iron changes in response to changes in tip temperature.

It will be appreciated that the output from the first circuit 28 may be varied in ways other than pulse width for the purpose of allowing the second and third circuits 30, 32 to recognize when voltage and frequency should be adjusted. For example, voltage level may also be used to indicate whether a drop in tip temperature relatively small, medium, or large.

In some embodiments, the voltage is adjusted proportionally with the change in current detected through the current detector 24. For example, a large change in current, which corresponds to a large drop in tip temperature, causes a proportionally greater voltage level to be provided to the induction coil 16. That is, the peak-to-peak voltage in FIG. 2C is proportionally increased. A small change in current, which corresponds to a small drop in tip temperature, causes a proportionally smaller voltage level to be provided to the coil 16. That is, the peak-to-peak voltage in FIG. 2C is proportionally decreased.

Figure 3A:
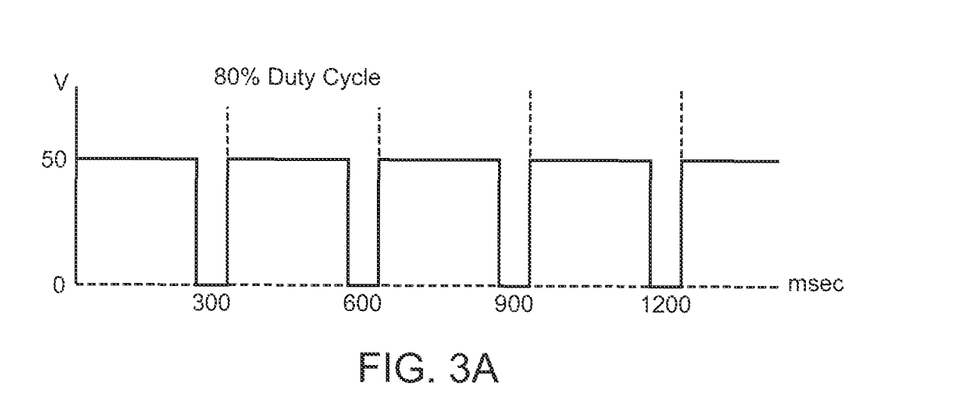
FIGS. 3A and 3B are graphs showing exemplary output voltage at different duty cycles as provided by a DC-DC converter in the power assembly of FIG. 1.
Figure 3B:
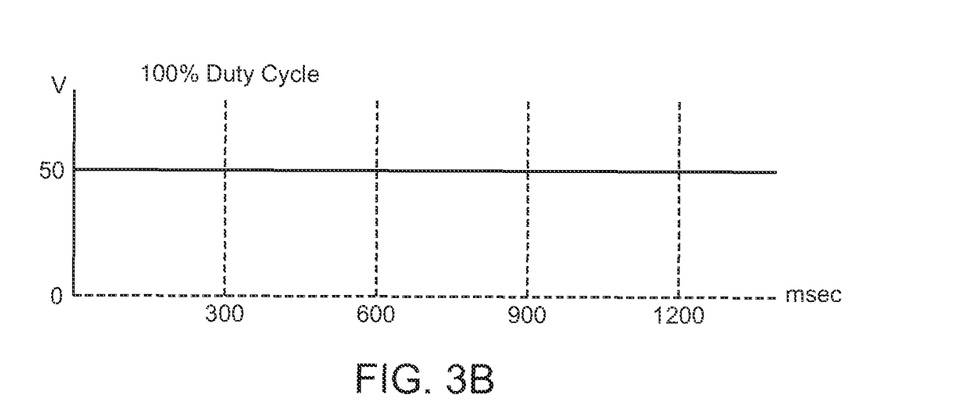

In some embodiments, time-based proportional output may be implemented. As previously explained, the DC-DC converter 40 provides a DC output voltage at a constant voltage level. In time-based proportional output, the duty cycle for the constant DC output voltage varies in proportion to the measured change in current. For example, the duty cycle may be 70% when there is no temperature drop detected, the duty cycle may be 80% as shown in FIG. 3A when a small temperature drop is detected, and the duty cycle may be 100% as shown in FIG. 3B when an intermediate temperature drop is detected. In this example, the coil 16 is provided with power 80% of the time when a small temperature drop is detected, which is an increase of 10% compared to when there is no temperature drop, and is provided with power 100% of the time when an intermediate temperature drop is detected.

In some embodiments, the duty cycle may be adjusted using the temperature selector 22. For example, when the temperature selector 22 is moved from "high" to "low," the duty cycle may change from the previously mentioned duty cycle percentages to 70% for a small temperature drop and 90% for an intermediate temperature drop. It will be appreciated that other duty cycle percentages may be implemented in other embodiments.

Applicant has found that there is a limit to which the tip temperature drop may be compensated by an increase in voltage. That is, voltage can only be increased up to a threshold level beyond which operation of the system is adversely affected. Thus, for large temperature drops, both voltage and frequency are increased. Applicant has also found that increasing frequency may introduce electrical noise and increase power loss. Thus, relatively small and medium drops in tip temperature are handled by a change in voltage only in some embodiments. Frequency is preferably increased only when there is a relatively large temperature drop wherein the voltage provided to compensate for the temperature drop has reached the threshold value.

Referring again to FIG. 1, a status indicator 50 may be connected to the comparators 25a, 25b, 25c. The status indicator 50 may include a separate light emitting diode (LED) coupled to each one of the comparators. The LEDs correspond to different electrical current level ranges. Illumination of the LEDs provides a visual indication to the user of the operational status or state of the tip 12. In some embodiments only one LED is illuminated at any one time. For example, only the LED that corresponds to the current level range for the measured current may illuminate. In other embodiments, any combination of LEDs may illuminate in a progressive manner.

An output port 52 may be coupled to the status indicator 50 to allow the operational status of the tip 12 to be monitored and recorded over time by an external device (not shown) in communication with the output port 52. The output port 52 may be an electrical connector adapted to mate with a connector of the external device. The output port 52 may include a means of transmitting data in a wireless manner to the external device, such as by radio frequency signals or optical signals. Data regarding the use status of the tip 12 may be recorded and used to evaluate production workflows in order to improve efficiency and work product quality.

In other embodiments, a smoothing processor is disposed along the electrical path connecting the comparators 25a, 25b, 25c and the status indicator 50. The smoothing processor is adapted to eliminate flickering of the status indicator that may occur as a consequence of small fluctuations in the detected current in the induction coil 16.

Figure 4:
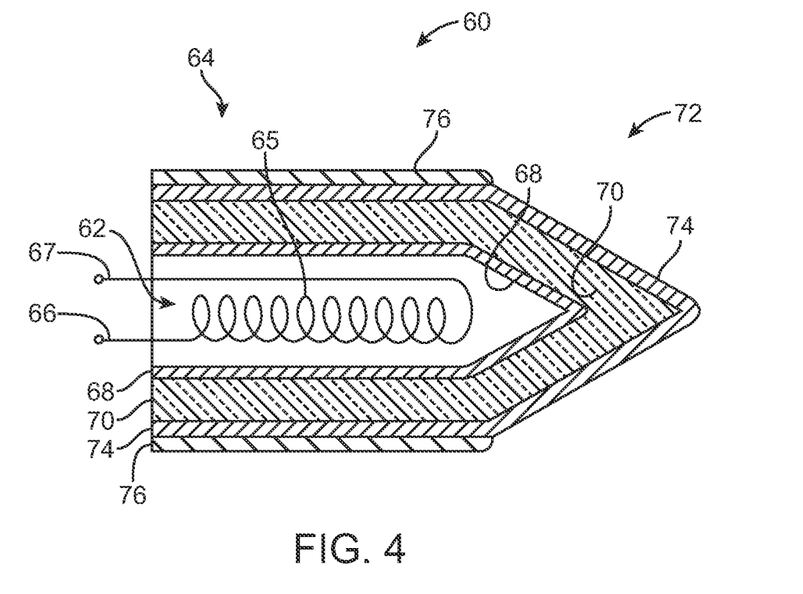
FIG. 4 is a cross-sectional view of a soldering iron tip in accordance with aspects of the present invention, showing an induction coil surrounding by multiple layers of material, the layers including an inner ferrous layer, a middle heat-conducting core, and an outer corrosion-inhibiting layer.

Referring next to FIG. 4, a soldering iron tip 60 in some embodiments includes a central bore 62 formed in a rear segment 64 of the tip. A magnetic induction coil 65 is disposed in the bore 62. The coil 65 includes two electrical leads that extend out from the bore 62. One electrical lead 66 is connected to an RF energy source and the other lead 67 is connected to a current detector. When RF energy is supplied to lead 66, the magnetic induction coil 65 heats a heater layer of material 68 that surrounds the coil and is located within the interior of tip 60. The coil 65 is spaced apart from and does not form an electric connection to the surrounding heater material 68. In other embodiments, the coil 65 is covered with dielectric insulation and is located immediately adjacent the surrounding heater material 68.

The composition of the surrounding heater material 68 may be selected based on proximity of the Curie point of the composition to the desired working temperature. For soldering applications, the surrounding heater material 68 is composed of an iron-nickel alloy. Applicant has found that certain iron-nickel alloys have an appropriate Curie point for soldering applications.

The heater layer 68 is encased by a heater core material 70 adapted to conduct heat from the heater layer to a forward portion 72 of the tip 60 that is intended to contact a workpiece. The composition of the heater core material 70 may be selected based on its ability to efficiently conduct thermal energy. A suitable material for the heater core material 70 includes, without limitation, copper. The core material 70 can be entirely covered by a corrosion-inhibiting layer of material 74. The corrosion-inhibiting material 74 may be plated onto the core material 70. A suitable material for the corrosion-inhibiting material 74 includes, without limitation, iron. The rear portion 64 of the tip 60 may be covered with a solder barrier to prevent solder from creeping away from the forward, working end 72 of the tip 60. A suitable solder barrier includes, without limitation, a layer of chrome plating 76.

Figure 5:
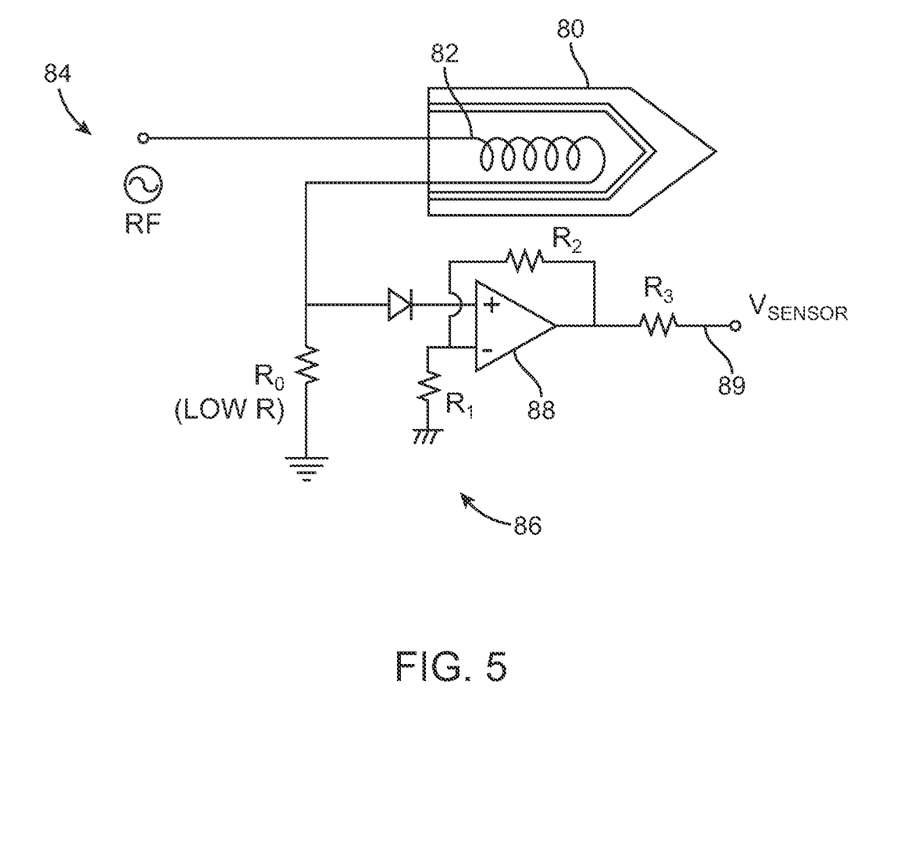
FIGS. 5 and 6 are schematic diagrams showing exemplary means for measuring current in an induction coil within a soldering iron tip.

Referring next to FIG. 5, a magnetic induction tip 80 includes an induction coil 82 having one lead connected to an RF energy source 84 and another lead connected to a current detector 86 adapted to measure the level of electrical current in the coil 82. The level of electrical current is represented by a voltage across a series resistor, Ro, which is amplified by amplifier 88 and is transmitted as Vsensor to a control assembly via output lead 89. In some embodiments, the control assembly is configured as shown in FIG. 1.

Figure 6:
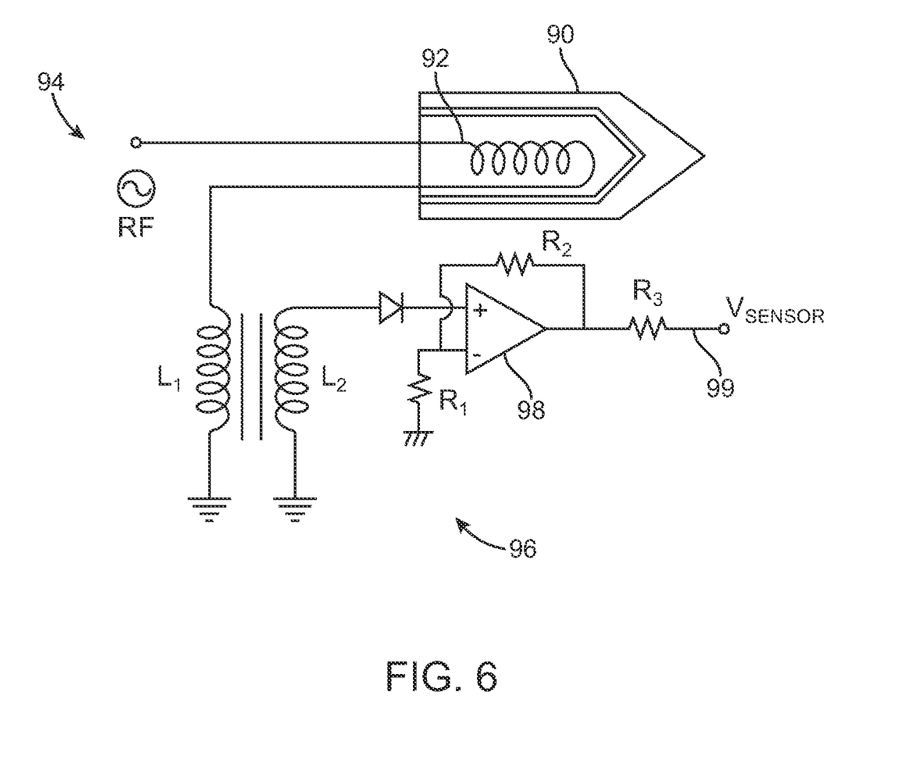

Referring next to FIG. 6, a magnetic induction tip 90 includes an interior induction coil 92 with one terminal connected to an RF energy source 94 and another terminal connected to an exterior coil, L1, that is part of a current detector 96. The current detector 96 measures the level of electrical current passing through the induction coil 92. The level of electrical current is represented by a voltage induced across a sensing coil, L2, by the exterior coil, L1. The induced voltage is amplified by amplifier 98 and is transmitted, as Vsensor, to a control assembly via output terminal 99. In some embodiments, the control assembly is configured as shown in FIG. 1.

While several particular forms of the invention have been illustrated and described, it will also be apparent that various modifications can be made without departing from the scope of the invention. For example, it will be appreciated by persons skilled in the art that other heater configurations in a soldering iron tip and other current detection circuits may be utilized in soldering iron systems and methods of the present invention. As a further example, other soldering and desoldering tip shapes are within the scope of the invention, including but not limited to chisel tips, knife tips, tweezer tips, and shapes including suction tubes for removing solder from a workpiece. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. An induction heating soldering iron system comprising:
    a power assembly adapted to deliver power at an output voltage and an output frequency;
    a magnetic induction heater adapted to receive the power from the power assembly, the heater having a temperature dependent upon the output voltage and the output frequency of the power assembly;
    a current detector adapted to determine a current flow in the heater; and
    a control assembly in communication with the current detector, the control assembly is configured to measure a non-zero magnitude of change in the current flow in the heater, configured to measure a non-zero time duration of the change in current flow in the heater, and is adapted to control temperature of the heater in proximity of the Curie point of the heater material by changing the output voltage in accordance with the non-zero time duration and the magnitude of change in the current flow in the heater.

2. The system of claim 1, further comprising a temperature selector having a plurality of settings each corresponding to a different desired temperature of the heater above room ambient temperature, wherein the control assembly is in communication with the temperature selector and is configured to control the power assembly to change at least one of the output voltage and the output frequency in accordance with a setting of the temperature selector and the current flow in the heater.

3. The system of claim 1, wherein the heater includes a magnetic alloy and a coil adapted to induce an electrical current in the magnetic alloy when the coil receives power.

4. The system of claim 1, wherein the power assembly is adapted to provide the output frequency within the range of about 200 kHz to about 600 kHz.

5. The system of claim 1, further comprising a status indicator operatively coupled to the current detector, the status indicator adapted to provide a visual indication of the current in the heater.

6. The system of claim 1, further comprising an output port operatively coupled to the current detector, the output port adapted to provide data representative of the current in the heater.

7. The system of claim 1, wherein the power assembly is adapted to deliver power to the heater at a duty cycle percentage, and the control assembly is further adapted to change the duty cycle percentage in accordance with any one or both of the magnitude of change in current flow in the heater and a desired temperature.

8. A method for operating an induction heating soldering iron, the method comprising:
    selecting an operation level from a plurality of operation levels;
    supplying power to a coil at a voltage and a frequency, at least one of the voltage and the frequency being dependent upon the selected operation level, the voltage and the frequency causing magnetic induction heating of a soldering iron tip;
    determining a non-zero magnitude of change in current flow in the coil;
    measuring a non-zero time duration in the change in current flow in the coil; and
    adjusting the voltage in accordance with the determined magnitude of change in the current flow and the non-zero time duration in the change in current flow;
    wherein the soldering iron is operated at the proximity of the Curie point of a heater material of the soldering iron.

9. The method of claim 8, wherein the voltage and frequency are sufficient to induce magnetic induction heating of the soldering iron tip to a temperature above the Curie temperature of the soldering iron tip.

10. The method of claim 8, further comprising recording data representative of the determined magnitude of change in the current flow in the coil.

11. The method of claim 8, wherein supplying the power to the coil includes supplying the power at a duty cycle percentage, and further comprising adjusting the duty cycle percentage in accordance with any one or both of the determined magnitude of change in the current flow and the selected operation level.

12. The system of claim 1, wherein the control assembly is configured to control the power assembly to increase the power delivered to the heater according to the non-zero magnitude of the change in the current flow in the heater.

13. The system of claim 1, wherein the control assembly changes the output voltage in accordance with the non-zero time duration and the magnitude of change in the current flow in the heater by making the change on condition that the non-zero time duration equals or exceeds a threshold time duration.

14. The system of claim 13, wherein the threshold time duration is 1 second.

15. The system of claim 13, wherein the threshold time duration is 2 seconds.

16. The method of claim 8, further comprising comparing the non-zero time duration to a threshold time duration, and wherein the adjusting step is performed on condition that the non-zero time duration equals or exceeds the threshold time duration.

17. The method of claim 16, wherein the threshold time duration is 1 second.

18. The method of claim 16, wherein the threshold time duration is 2 seconds.

* * * * *